United States Patent [19]

Overhoff

[11] Patent Number: 5,539,208

[45] Date of Patent: Jul. 23, 1996

[54] SURFACE RADIATION DETECTOR

[76] Inventor: Mario W. Overhoff, Overhoff Technology Corporation 1160 U.S. Rte. 50, Milford, Ohio 45150-9705

[21] Appl. No.: 379,185

[22] Filed: Jan. 27, 1995

[51] Int. Cl.$^6$ .................................................. G01T 1/185
[52] U.S. Cl. .................................. 250/379; 250/374
[58] Field of Search .................................. 250/379, 374, 250/375, 385.1

[56] References Cited

U.S. PATENT DOCUMENTS

| | | |
|---|---|---|
| 2,499,830 | 3/1950 | Malloy . |
| 2,509,700 | 5/1950 | Simpson, Jr. . |
| 2,837,656 | 6/1958 | Hendee et al. . |
| 2,978,602 | 4/1961 | Barnothy . |
| 3,132,249 | 5/1964 | Maggio et al. . |
| 3,408,571 | 10/1968 | Wilson . |
| 3,603,831 | 9/1971 | Kimmel . |
| 3,935,464 | 1/1976 | Zingaro . |
| 3,984,691 | 10/1976 | Allemand et al. . |
| 4,262,203 | 4/1981 | Overhoff . |
| 4,264,816 | 4/1981 | Walenta . |
| 4,288,694 | 9/1981 | Abrams . |
| 4,297,689 | 10/1981 | Shaw . |
| 4,426,580 | 1/1984 | Smith . |
| 4,485,307 | 11/1984 | Osborne et al. . |
| 4,755,682 | 7/1988 | Burgess . |
| 4,827,224 | 5/1989 | Kershner et al. . |
| 4,859,854 | 8/1989 | Kershner et al. . |
| 5,298,754 | 3/1994 | Anderson et al. . |

OTHER PUBLICATIONS

"A Monitor for Tritium in Air Conditioning Other Beta Emitters" *Proceedings of 234d 1975 Conference on Remote Systems Technology*, pp. 89–93.
"Ionization Chambers and Counters"; D. H. Wilkinson, 1950, Chapter 5, pp. 105–112 Cambridge University Press.
"Nuclear Radiation Detection" by William J. Price 1958, Chapter 4, pp. 67, 75, 101–106 and 358, 359. McGraw-Hill Book Company Inc. New York.

*Primary Examiner*—Constantine Hannaher
*Attorney, Agent, or Firm*—Biebel & French

[57] ABSTRACT

A surface radiation detector for sensing low energy ionizing radiation on the surface of an object includes a open window gas proportional counter provided with a compressible skirt surrounding the window in a detection chamber. The compressible skirt is preferably of open cell plastic foam, but may be made from a gas impermeable sheet formed in the shape of an accordion bellows. An open screen of electrically conductive material, attached to said skirt and covering the window, may be placed in direct contact with the surface of an object to be tested. Counter gas flows at a rate into the chamber sufficient to maintain a positive pressure in the chamber relative to the ambient atmosphere. A momentarily actuated valve supplies additional counter gas at a flow rate sufficient to fill said chamber within a short period of time. A self-collapsing bladder is connected to said chamber for temporarily storing the counter gas when the skirt is compressed as the instrument is pressed against the tested surface and for releasing the gas when the instrument is removed from the surface.

9 Claims, 3 Drawing Sheets

SURFACE RADIATION DETECTOR

BACKGROUND OF THE INVENTION

This invention relates to a surface radiation detector, and specifically an instrument for detecting low energy radiation that may be contaminating a surface of an object.

This invention has particular application in radio-pharmaceutical laboratories of hospitals or other laboratories where carbon-14, tritium or other similar radioactive materials may be used. When such radioactive products are used, it is necessary to test for surface contamination from time to time to insure that the working area is free of radioactive components. One prior method for conducting a surface contamination test is to take a moistened towel or and wipe the surface. The towel is then placed in a scintillation counter where any radioactivity picked up is measured. Since all surfaces that are subject to contamination must be tested, this can be a time consuming process. A hand-held surface radioactive detector or counter would save a great deal of time in the examination of such surfaces.

Several radioactive detectors or counters may be used for this purpose, but many are very expensive. A gas proportional counter is inexpensive and may be used, provided the radioactive contamination can be brought into the enclosed gas chamber where it can be detected. Carbon-14 or tritium are both beta emitters, and the energy level of the beta particles is very low; for tritium, the maximum energy is in the order of up to 18 KEV, and for carbon-14, the maximum energy is 155 KEV. To measure low energy beta, an open window counter may be employed, such as the device shown and described in U.S. Pat. No. 3,603,831, issued Sep. 7, 1971. An essentially open window is necessary because any obstruction between the source and the interior of the counter will stop or absorb the beta particles.

A gas proportional counter requires a source of counter gas, often a mixture of argon and carbon dioxide or argon and methane, such as a commercially available mixture known as P10. Water vapor and oxygen must be excluded from the detection chamber. Counter gas, however, is relatively expensive, so it would be desirable to conserve the gas as much as possible, but the detector is basically open to gas flow through the screen.

Also to be taken into consideration is the characteristics of the radioactive emissions from tritium. The mean free path of beta emissions from tritium are short; the maximum path is about 5 mm, the mean is under 1 mm, which means that one-half the beta emissions are less than that. The advantage of an open screen gas proportional counter is that once a beta particle passes the screen, it will be counted. The problem is in getting the screen close enough to the beta particles that they can pass through the screen and be counted. If the screen is not close enough to the surface under test, then the beta particles simply will not pass through the screen.

Further, the area covered by the detecting instrument preferably should be at least $100^2$ cm; however, many surfaces on which radioactive contamination may be found are simply not flat, and unless the entire area of the screen is close enough to the surface to measure low energy radiation, then the desired area of inspection will not be achieved.

SUMMARY OF THE INVENTION

This invention is based on a gas proportional counter which includes a closed volume or chamber containing an electrode supplied with a high voltage potential and a gas which is free of oxygen. In these instruments, ionizing radiation will be detected through a combination of gas amplification and electronic amplification whenever a radioactive particle decays within the chamber.

In the present invention, the problem of excessive gas flow is solved by providing a low rate of gas flow sufficient to maintain a positive pressure of counter gas within the chamber, and a momentarily actuated valve through which a supply of counter gas may flow into the chamber at a high rate sufficient to fill the chamber and to purge any water vapor and oxygen therefrom in a short period of time. The momentarily actuated valve would preferably be operated for a short period of time after the instrument is placed on the surface, in the order of one or two seconds.

In the present invention, the problem of irregular or non-flat surfaces is also solved through the use of a conformable screen surface. This is accomplished by providing a compressible skirt placed between the screen and the chamber. When the instrument is pressed against the surface to be tested, the screen is urged or biased against the surface across its entire area. Thus, minimum separation between the screen and the surface is achieved, allowing radioactive particles of very low energy to pass through the screen and into the detection chamber.

Additional gas savings are accomplished by providing a bladder within the instrument to capture or temporarily store the detection gas within the chamber when the skirt is compressed.

It is therefore an object of this invention to provide a detector for determining whether ionizing radiation is located on the surface of an object, the detector including a chamber containing a electrically charged wire and a counter gas, the chamber including a gas impermeable housing which is provided with an opening having sufficient area to monitor surface radioactivity, a open, gas permeable screen covering the opening and in electrical contact with the housing, an inlet for providing gas to the chamber at a first predetermined flow rate, and a momentarily actuated valve through which a supply of counter gas may flow into the chamber at a second predetermined flow rate sufficient to fill the chamber within a short period of time.

It is another object of this invention to provide a detector for sensing low energy ionizing radiation on the surface of an object including a chamber, a portion of the chamber defining a window, at least one wire electrode contained within the chamber, a compressible skirt surrounding and extending from the window, a screen attached to the skirt and covering the window, the screen being permeable to radiation of low energy and adapted to be placed in direct contact with the surface of the object, an electrical connection between the screen and the chamber, an opening in the chamber through which a supply of gas may flow at a rate sufficient to maintain a positive pressure in the chamber relative to the ambient atmosphere, a momentarily actuated valve through which a supply of gas may flow into the chamber at a flow rate sufficient to fill the chamber within a short period of time, and a normally compressed bladder connected to the chamber for temporarily storing the gas when the skirt is compressed.

It is still a further object of this invention to provide a detector for determining whether ionizing radiation is located on the surface of an object, the detector including a chamber for containing a electrically charged wire and a gas, the chamber including a gas impermeable housing which is provided with a window of sufficient area to monitor surface radioactivity, a compressible skirt having one end surrounding and extending from the window, and a open, gas permeable screen attached to the outer end of the skirt and in electrical contact with the housing, a normally compressed bladder in communication with the chamber for temporarily receiving gas from within the chamber when the skirt is compressed, an inlet for providing gas to the chamber, and means for providing a flow of gas into the chamber at a rate sufficient to maintain a positive pressure therein.

It is another object of this invention to provide a method of detecting low energy ionizing radiation on the surface of an object including the steps of providing a ionization detection chamber having an open mesh screen supported by a compressible skirt, placing the screen in direct contact with the surface to be monitored, compressing the skirt to cause the screen to conform to the surface being monitored, replacing any ambient atmosphere within the chamber with a counter gas, and counting any ions within the chamber.

Other objects and advantages of the invention will be apparent from the following description, the accompanying drawings and the appended claims.

DESCRIPTION OF THE PREFERRED EMBODIMENT

Figure 1:
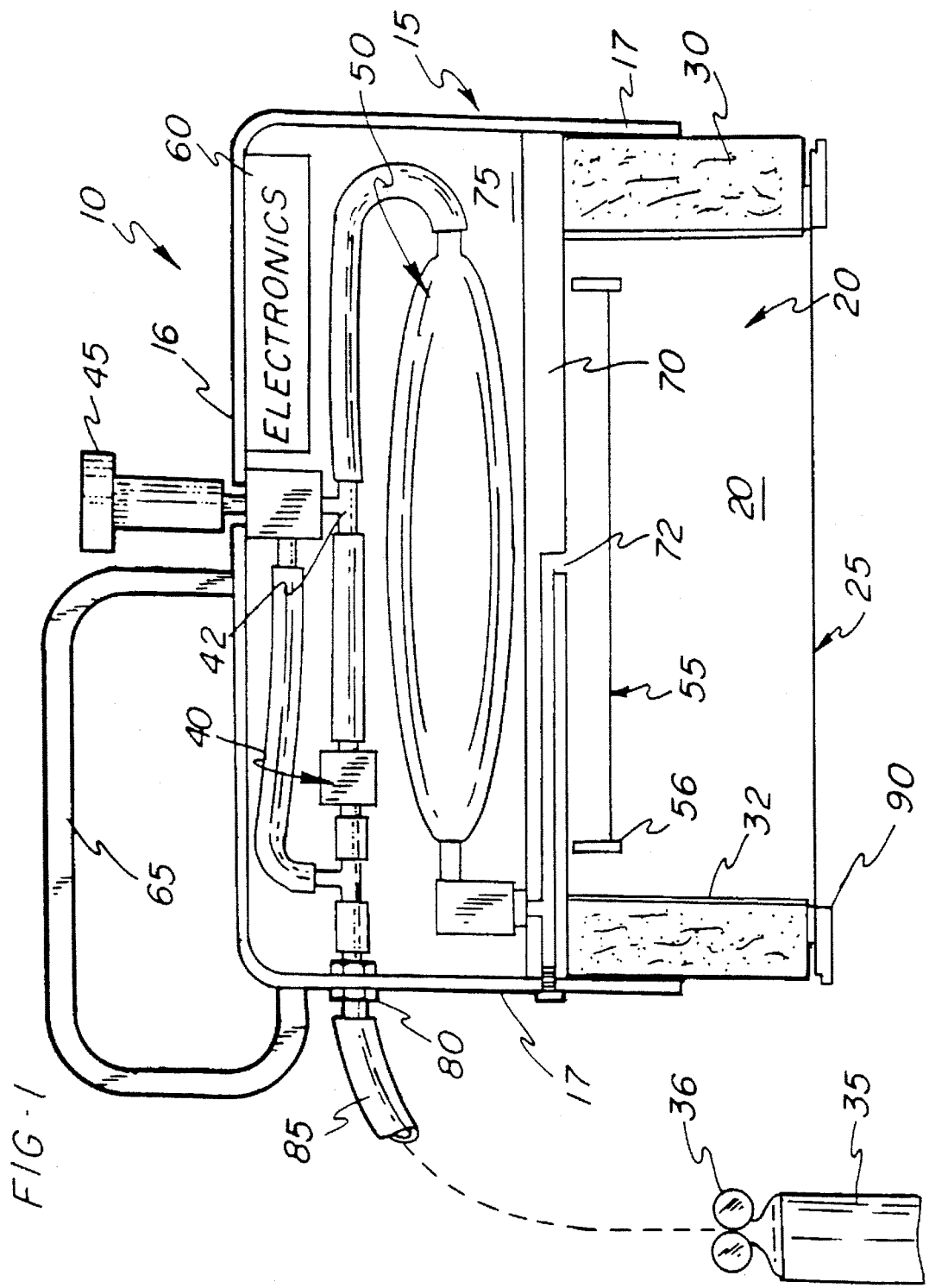
FIG. 1 is a side cross-sectional view of the radiation detection instrument of the present invention.

Turning now to the drawings which show a preferred embodiment of the invention, are particularly to FIG. 1 which is a cross-sectional view of a radiation detecting instrument shown generally at 10. The major components of the instrument include a housing 15, gas detecting chamber 20, an open, gas permeable screen 25, a compressible skirt 30, a source of counter gas 35 and associated hoses, a metering valve 40, a momentarily actuated valve 45, a self-collapsing bladder 50, electrode wires 55, and an electronic package 60 which includes a visual display and a battery.

In FIG. 1, the housing 15 is a box-like structure that is generally rectangular as viewed from the top and includes a top surface 16 and side walls 17 that extend around its periphery. A handle 65, which extends from the top surface to an upper portion of one end, allows the instrument to be easily positioned above a surface to be tested. The momentarily actuated valve 45 is pushbutton controlled with the actuating button placed where it can be depressed by the thumb of an operator while holding the handle 65. The interior of the housing contains a plate 70 which separates the gas detecting chamber 20 from a compartment 75.

The compartment 75 contains the valves 40 and 45, bladder 50 and the hoses which connect these components to a fitting 80 that extends through the side wall 17. A hose 85 extends from the fitting 80 to a source of counter gas 35, such as an 90% argon—10% methane gas mixture known in the industry as P10 gas. The source of gas 35 is typically provided with its own flow control valve 36. The valve 40 is a metering valve designed to cause a first predetermined rate of flow of gas to enter the chamber 20 through an orifice 72 in the plate 70.

As shown in FIG. 1, the outlet of the valve 40 is connected to a T-fitting 42 which has as another of its inputs the output of valve 45 and the outlet of the T-fitting is connected to one end of bladder 50 with the other end of the bladder is connected to a the orifice 72. It should be understood that the outlet of valve 40 could be connected directly to a separate orifice in the plate 70 as could the outlet of valve 45. Further, instead of routing the counter gas flow through the bladder 50, the bladder could be connected directly to the chamber 20 through an additional orifice in plate 70.

The electronic package 60 includes a battery, a high voltage power supply, a radiation display meter and other components, none of which form a part of the present invention. The display meter is viewable on the upper surface 16 of the housing 15.

Figure 2:
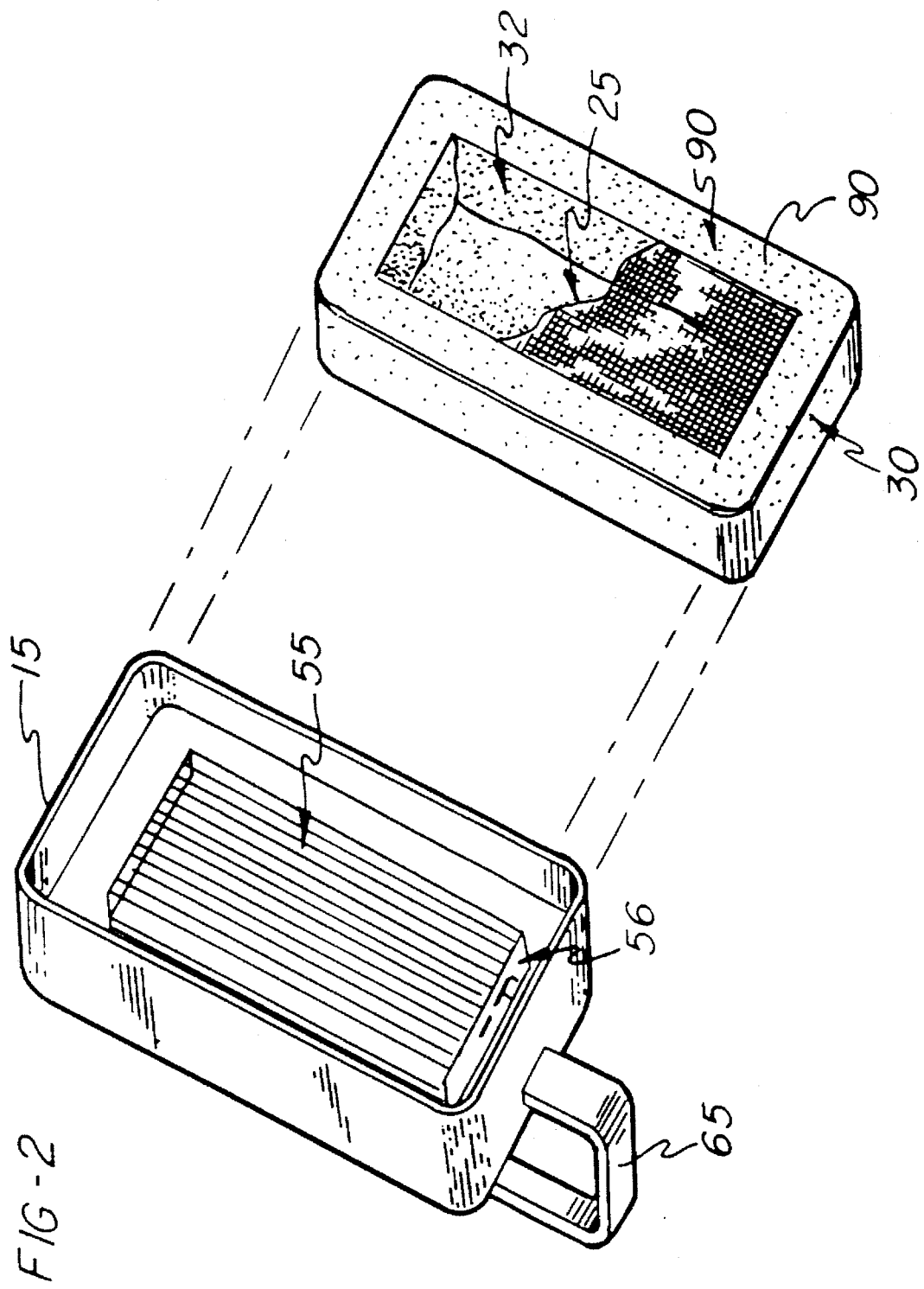
FIG. 2 is an exploded bottom perspective view of the radiation detection instrument of the present invention showing corona wires within the detection chamber and the compressible skirt and screen separated from the instrument.

A set of electrode wires 55 is mounted in the chamber 20, as shown in FIGS. 1 and 2. In the preferred embodiment, 10 to 12 thin wires extend for a majority of the length of the chamber and are attached at each end to an insulator 56 mounted to the plate 70. These wires are electrically connected to the electronic package 60 by a wire, not shown.

As shown in FIG. 1, the chamber 20 is enclosed on its top by the plate 70 and on its sides by the wall 17 and compressible skirt 30. The lower portion of the chamber defines a window which is covered by screen 25. While the terms top, side and bottom have been used in connection with the preferred embodiment shown in FIG. 1, it is to be understood that these are merely relative terms used for convenience in describing the invention, and that the instrument shown can be used in any position.

The compressible skirt 30, also shown in FIGS. 1 and 2, has the same outside dimensions and configuration as the inside of the housing 15 and extends below the side wall 17 where it is covered with the screen 25. The compressible skirt in a preferred embodiment of the invention is made from an open cell plastic material, which allows it easily to be compressed, but since it is an open cell material, counter gas can leak therethrough; therefore, a thin plastic sheet 32 of gas impermeable material surrounds the skirt. As shown in FIG. 1, the sheet extends from the top surface to the bottom surface on the inside of the skirt, but it could be placed on the outside to achieve the same purpose of sealing the chamber 20. Alternatively, a gas impermeable skirt could be provided, but since it must be compressed, it would take the form of an accordion bellows.

A rubber gasket 90 is placed around the periphery of the screen 25 on the bottom surface of the skirt to provide a gas seal when the screen is placed in contact with the surface to be tested. A wire, not shown, provides an electrical connection between the screen 25 and the housing 15.

Figure 3:
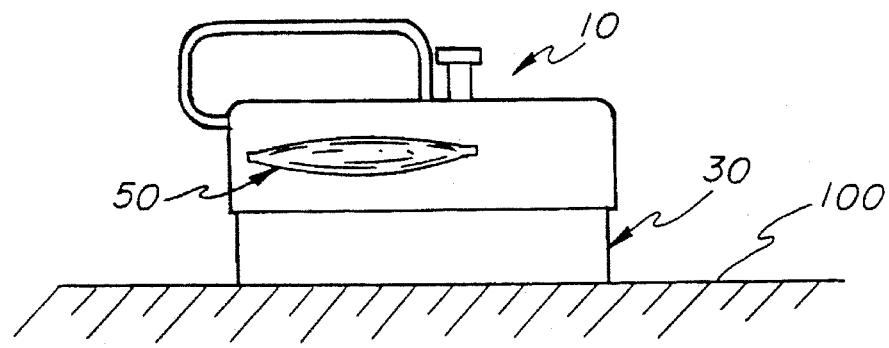
FIG. 3 is a side elevational view showing the instrument of FIG. 1 prior to the skirt being compressed.
Figure 4:
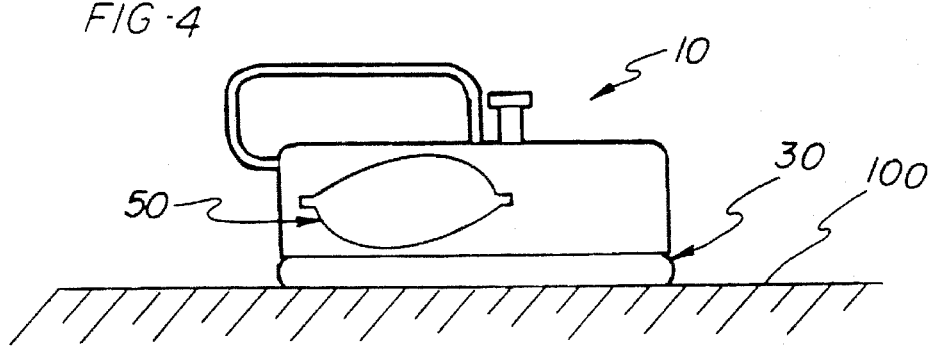
FIG. 4 is a side elevational view showing the instrument of FIG. 1 with the skirt compressed.

Turning now to FIGS. 3 and 4 in combination with FIG. 1, when the instrument 10 is initially placed over a surface 100 to be tested, counter gas has been flowing into the detection chamber at a low rate; however, since the window of the instrument has not, up to this point in time, been sealed, it may be necessary to purge any oxygen and water vapor within the chamber, and this can be done by pressing the pushbutton actuator on valve 45 which will cause the flow of gas to increase. At this time, the bladder 50 is essentially empty, notwithstanding the fact that in the embodiment shown, the counter gas flows through it to the chamber 20.

Figure 5:
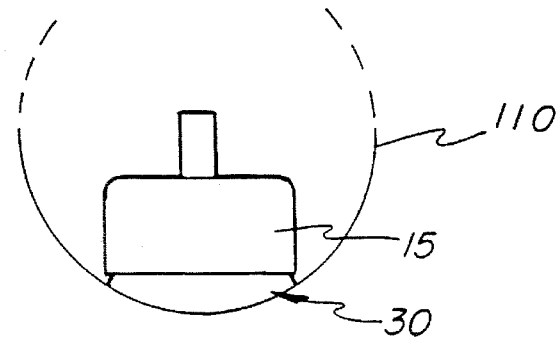
FIG. 5 is an end view of the instrument with the skirt compressed and the screen surface conforming to an interior curved surface, such as found on the inside of a duct.
Figure 6:
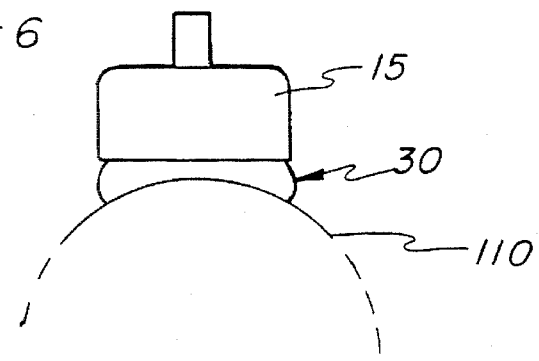
FIG. 6 is an end view of the instrument with the skirt compressed and the screen surface conforming to an exterior curved surface, such as found on the outside of a duct.

The operator next presses down on the instrument to force the screen into direct contact with the surface 100. As shown in FIGS. 5 and 6, the surface may be curved, or the surface have some other irregularity which would otherwise prevent a proper gas seal from being formed. As the skirt 30 is compressed, counter gas within the chamber is forced into the bladder 50 where it is temporarily stored until the instrument is removed from the surface, at which time, the gas will be released back into the chamber. By using the bladder in this way, counter gas is not lost when the skirt is compressed, and ambient air is not as likely to be introduced into the chamber when the skirt is relaxed.

As shown in FIGS. 5 and 6, the smallest radius of a duct 110 on which the instrument can be used will depend upon the length of the skirt that extends below the bottom edges of wall 17. Skirts of various lengths can be provided, where necessary, to accommodate special applications.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A detector for determining whether ionizing radiation is located on the surface of an object, said detector including a chamber containing a electrically charged wire and a counter gas, said chamber including a gas impermeable housing which is provided with an opening having sufficient area to monitor surface radioactivity, a open, gas permeable screen covering said opening and in electrical contact with said housing, a compressible skirt surrounding and extending from said opening, an inlet for providing gas to said chamber at a first predetermined flow rate, and a momentarily actuated valve through which a supply of counter gas may flow into said chamber at a second predetermined flow rate sufficient to fill said chamber within a short period of time.

2. The detector of claim 1 wherein said opening is approximately 100 cm$^2$.

3. A detector for sensing low energy ionizing radiation on the surface of an object including a chamber, a portion of said chamber defining a window, at least one wire electrode contained within said chamber, a compressible skirt surrounding and extending from said window, a screen attached to said skirt and covering said window, said screen being permeable to radiation of low energy and adapted to be placed in direct contact with the surface of the object, an electrical connection between said screen and said chamber, an opening in said chamber through which a supply of gas may flow at a rate sufficient to maintain a positive pressure in said chamber relative to the ambient atmosphere, a momentarily actuated valve through which a supply of gas may flow into said chamber at a flow rate sufficient to fill said chamber within a short period of time, and a self-collapsing bladder connected to said chamber for temporarily storing said gas when said skirt is compressed.

4. A detector for determining whether ionizing radiation is located on the surface of an object, said detector including a chamber for containing a electrically charged wire and a gas, said chamber including a gas impermeable housing which is provided with a window of sufficient area to monitor surface radioactivity, a compressible skirt having one end surrounding and extending from said window, and a open, gas permeable screen attached to the outer end of said skirt and in electrical contact with said housing, a self-collapsing bladder in communication with said chamber for temporarily receiving gas from within said chamber when said skirt is compressed, an inlet for providing gas to said chamber, and means for providing a flow of gas into said chamber at a rate sufficient to maintain a positive pressure therein.

5. The detector of claim 4 further including a gasket placed around the periphery of said screen to provide a gas seal when said screen is placed in contact with a surface to be tested.

6. The detector of claim 4 wherein said compressible skirt is formed from open cell plastic foam and covered with an gas impermeable flexible thin sheet.

7. The detector of claim 4 wherein said compressible skirt is formed from a gas impervious sheet formed in the shape of an accordion bellows.

8. The detector of claim 4 further including a momentarily actuated valve through which a supply of gas may flow into said chamber at a flow rate sufficient to fill said chamber with said gas within a short period of time.

9. A method of detecting low energy ionizing radiation on the surface of an object including the steps of providing a ionization detection chamber having an open mesh screen supported by a compressible skirt, placing the screen in direct contact with the surface to be monitored, compressing the skirt to cause the screen to conform to the surface being monitored, replacing any ambient atmosphere within the chamber with a counter gas, and counting any ions within said chamber.

* * * * *